United States Patent
Luo

(10) Patent No.: US 12,069,474 B2
(45) Date of Patent: Aug. 20, 2024

(54) HOUSEHOLD APPLIANCE NETWORKING METHOD AND APPARATUS, ELECTRONIC DEVICE, AND STORAGE MEDIUM

(71) Applicants: GD MIDEA AIR-CONDITIONING EQUIPMENT CO., LTD., Guangdong (CN); MIDEA GROUP CO., LTD., Guangdong (CN)

(72) Inventor: Heng Luo, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 329 days.

(21) Appl. No.: 17/525,177

(22) Filed: Nov. 12, 2021

(65) Prior Publication Data
US 2022/0078612 A1    Mar. 10, 2022

Related U.S. Application Data

(63) Continuation of application No. PCT/CN2020/087210, filed on Apr. 27, 2020.

(30) Foreign Application Priority Data

May 17, 2019 (CN) .......................... 201910410972.0

(51) Int. Cl.
*H04W 12/06* (2021.01)
*H04L 9/40* (2022.01)
*H04W 84/12* (2009.01)

(52) U.S. Cl.
CPC ........... *H04W 12/06* (2013.01); *H04L 63/083* (2013.01); *H04W 84/12* (2013.01)

(58) Field of Classification Search
None
See application file for complete search history.

(56) References Cited

U.S. PATENT DOCUMENTS

| 9,378,343 B1 | 6/2016 | David et al. |
| 2004/0093515 A1* | 5/2004 | Reeves, Jr. ......... H04L 63/0807 726/28 |

(Continued)

FOREIGN PATENT DOCUMENTS

| CN | 1964260 A | 5/2007 |
| CN | 102656896 A | 9/2012 |

(Continued)

OTHER PUBLICATIONS

CN Office Action dated Mar. 29, 2021 issued in 201910410972.0.
(Continued)

*Primary Examiner* — Frantz Bataille
(74) *Attorney, Agent, or Firm* — Scully, Scott, Murphy & Presser, P.C.

(57) ABSTRACT

A household appliance networking method is provided. Pursuant to the method, in a household appliance networking mode, a wireless access point name and a password input by a user are obtained. Whether the wireless access point name and the password are correct is verified. Based on a verification that the wireless access point name and the password are correct, a configuration key value input by the user is obtained. Based on a determination that a networking verification according to the configuration key value fails, a target configuration key value in a preset mode is determined and the same is inputted, so as to enable successful household appliance networking. An apparatus, an electronic device, and a storage medium embodying the method are also provided.

10 Claims, 4 Drawing Sheets

(56) References Cited

U.S. PATENT DOCUMENTS

2010/0066839 A1    3/2010  Azuma et al.
2016/0127375 A1*  5/2016  Eluard .................. H04W 12/50
                                                                                     726/3

FOREIGN PATENT DOCUMENTS

| CN | 103763450 A | 4/2014 |
| CN | 105472699 A | 4/2016 |
| CN | 105792317 A | 7/2016 |
| CN | 105847321 A | 8/2016 |
| CN | 105959947 A | 9/2016 |
| CN | 106209537 A | 12/2016 |
| CN | 107018049 A | 8/2017 |
| CN | 105472699 B | 2/2019 |
| JP | 2004236036 A | 8/2004 |

OTHER PUBLICATIONS

International Search Report dated Jul. 27, 2020 issued in PCT/CN2020/087210.
Supplementary European Search Report dated May 18, 2022 received in European Patent Application No. EP 20808838.5.

* cited by examiner

HOUSEHOLD APPLIANCE NETWORKING METHOD AND APPARATUS, ELECTRONIC DEVICE, AND STORAGE MEDIUM

CROSS-REFERENCE TO RELATED APPLICATIONS

The present application is a continuation application of PCT International Application No. PCT/CN2020/087210, filed on Apr. 27, 2020, which claims priority to and benefits of Chinese Patent Application No. "201910410972.0" filed on May 17, 2019, the entire contents of which are incorporated herein by reference for all purposes. No new matter has been introduced.

FIELD

The present disclosure relates to the field of household appliances technology, and particularly to a method and apparatus for configuring a network of a household appliance, an electronic device and a storage medium.

BACKGROUND

Generally, when WIFI is used, the encryption methods often used mainly include Wired Equivalent Privacy (WEP), Wi-Fi Protected Access (WPA) adopting Temporal Key Integrity Protocol (abbreviated as TKIP), WPA2 using more secure encryption technology Advanced Encryption Standard (AES), and so on.

At present, WEP is still in use, and newly developed devices should also maintain compatibility with WEP. WEP supports 4 configuring key values, one of which is chosen to be encrypted during use. The user needs to re-input manually when the configuring key value filled by the user is null or incorrect. Thus, the operation is tedious.

SUMMARY

The present disclosure provides, according to embodiments thereof, a method and apparatus for configuring a network of a household appliance, an electronic device and a storage medium, which can promptly determine a target configuring key value and input the target configuring key value when the filled configuring key value is null or incorrect without additional cost, thereby improving the accuracy and efficiency for configuring a network of a household appliance. As a result, the problem in the related art can be solve, which includes that the user needs to re-input manually when the configuring key value filled by the user is null or incorrect and that the operation is tedious.

In an aspect, the present disclosure provides in embodiments a method for configuring a network of a household appliance, including:
  acquiring a wireless access point name and a password input by a user in a mode of configuring the network of the household appliance;
  verifying whether the wireless access point name and the password are correct;
  acquiring a configuring key value input by the user, if it is verified that the wireless access point name and the password are correct; and
  determining a target configuring key value according to a preset manner, and inputting the target configuring key value for successful configuration of the network of the household appliance, if configuration of the network is verified to fail according to the configuring key value.

In another aspect, the present disclosure provides in embodiments an apparatus for configuring a network of a household appliance, including:
  a first acquiring module, configured to acquire a wireless access point name and a password input by a user in a mode of configuring the network of the household appliance;
  a verifying module, configured to verify whether the wireless access point name and the password are correct;
  a second acquiring module, configured to acquire a configuring key value input by the user, if it is verified that the wireless access point name and the password are correct; and
  a processing module, configured to determine a target configuring key value according to a preset manner and input the target configuring key value for successful configuration of the network of the household appliance, if configuration of the network is verified to fail according to the configuring key value.

In still another aspect, the present disclosure provides in embodiments an electronic device, including: a memory; a processor; and a computer program stored in the memory and executable by the processor, wherein the processor, when executing the program, implements a method for configuring a network of a household appliance provided in above embodiments.

In yet another aspect, the present disclosure provides in embodiments a computer-readable storage medium having stored therein a computer program that, when executed by a processor, implements a method for configuring a network of a household appliance provided in above embodiments.

One or more technical solutions provided in embodiments of the present disclosure have at least the following technical effects or advantages. A wireless access point name and a password input by a user are acquired in a mode of configuring the network of the household appliance; and it is verified that whether the wireless access point name and the password are correct; a configuring key value input by the user is acquired, if it is verified that the wireless access point name and the password are correct; and a target configuring key value is determined according to a preset manner, and the target configuring key value is input for successful configuration of the network of the household appliance, if configuration of the network is verified to fail according to the configuring key value, which solves the technical problem in the related art that the user needs to re-input manually when the configuring key value filled by the user is null or incorrect and that the operation is tedious, and can quickly determine the target configuring key value and input the target configuring key value when the filled configuring key value is null or incorrect without additional cost, thereby improving the accuracy and efficiency for configuring a network of a household appliance.

BRIEF DESCRIPTION OF THE DRAWINGS

The above and/or additional aspects and advantages of the present disclosure will become obvious and understandable with the following description for embodiments by combining the drawings.

DETAILED DESCRIPTION OF EMBODIMENTS

Figure 1:
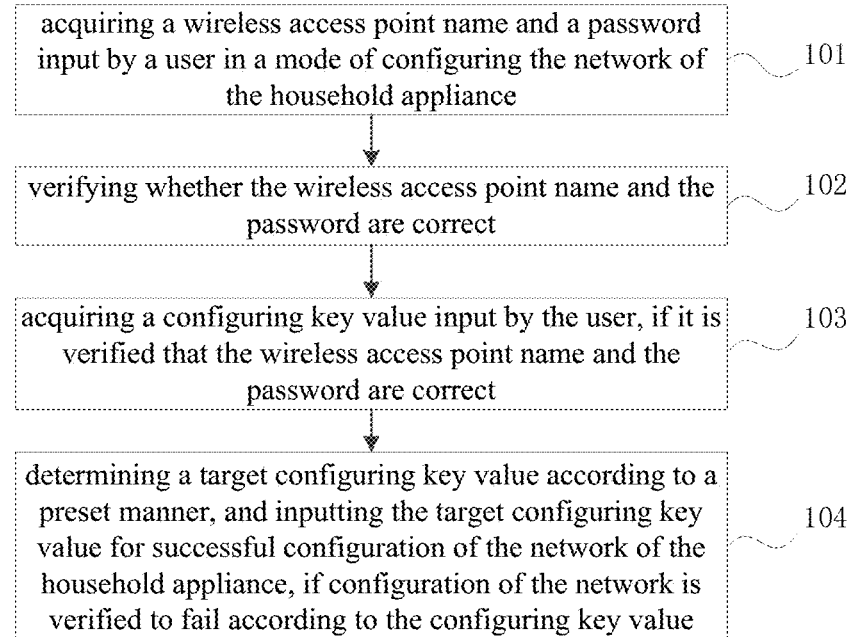
FIG. 1 is a flow chart showing a method for configuring a network of a household appliance according to Embodiment 1 of the present disclosure.

The present disclosure provides in embodiments a method for configuring a network of a household appliance, which mainly directs to the technical problem in the related art that the user needs to re-input manually when the configuring key value filled by the user is null or incorrect, where the operation is tedious. The method for configuring a network of a household appliance in embodiments of the present disclosure acquires a wireless access point name and a password input by a user in a mode of configuring the network of the household appliance; verifies that whether the wireless access point name and the password are correct; acquires a configuring key value input by the user if it is verified that the wireless access point name and the password are correct; and determines a target configuring key value according to a preset manner, and inputs the target configuring key value for successful configuration of the network of the household appliance, if configuration of the network is verified to fail according to the configuring key value, thus determining the target configuring key value and inputting the target configuring key value quickly when the filled configuring key value is null or incorrect without additional cost, thereby improving the accuracy and efficiency for configuring a network of a household appliance.

Exemplary embodiments of the present disclosure will be described in more detail below with reference to drawings for a better understanding of the above technical solutions. Although the exemplary embodiments of the present disclosure are shown in the drawings, it should be understood that the present disclosure may be implemented in various forms and should not be limited by the embodiments as described herein. On the contrary, these embodiments are provided for a better understanding of the present disclosure and to fully convey the scope of the present disclosure to those skilled in the art.

Embodiment 1

FIG. 1 is a flow chart showing a method for configuring a network of a household appliance provided in Embodiment 1 of the present disclosure.

Figure 2:
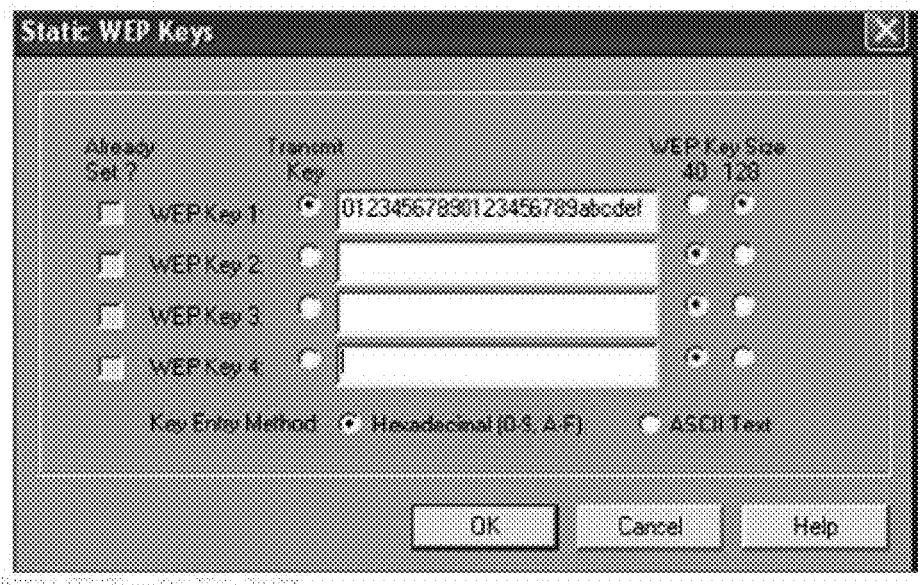
FIG. 2 is an exemplified view showing configuration of key values in the WEP mode according to Embodiment 1 of the present disclosure.

The method for configuring a network of a household appliance provided in embodiments of the present disclosure is based on the WEP encryption mode. As shown in FIG. 2, configuration in the WEP encryption mode has four configuring keywords. In FIG. 2, the configuring keyword 1 corresponds to the wireless access point name and password.

The household appliance may be, for example, an intelligent household appliance, such as a household air conditioner, a television and so on.

As shown in FIG. 1, the method for configuring a network of a household appliance includes the following steps: steps 101 to 104.

At step 101, a wireless access point name and a password input by a user are acquired in a mode of configuring the network of the household appliance.

At step 102, it is verified that whether the wireless access point name and the password are correct.

At step 103, a configuring key value input by the user is acquired, if it is verified that the wireless access point name and the password are correct (i.e., based on a verification that the wireless access point name and the password are correct).

In practical applications, it is required to configure a network for a household appliance. In operation, an instruction to configure the network may be transmitted to the household appliance by continuously pressing the screen of the household appliance according to a preset number of times, such that the household appliance enters the mode of configuring the network according to the instruction to configure the network. Alternatively, an instruction to configure the network is transmitted to the household appliance by pressing the screen of the household appliance for a preset duration, such that the household appliance enters the mode of configuring the network according to the instruction to configure the network.

It would be understood that there are many ways to determine whether the household appliance is in the mode of configuring the network. As an example, information from a display screen of the household appliance is acquired, and it is determined whether the household appliance is in the mode of configuring the network according to the information from the display screen. As another example, information about an indicator light of the household appliance is acquired, and it is determined whether the household appliance is in the mode of configuring the network according to the information about the indicator light.

Therefore, the wireless access point name and the password input by the user can be acquired in the mode of configuring the network of the household appliance, and a correct password corresponding to the wireless access point name can be acquired according to a preset key database or data table, etc. It is verified that whether the password input by the user are correct, and the configuring key value input by the user is acquired when the wireless access point name and the password are correct.

At step 104, a target configuring key value is determined according to a preset manner and the target configuring key value is input for successful configuration of the network of the household appliance, if configuration of the network is verified to fail according to the configuring key value (i.e., based a verification that the configuration of the network fails according to the configuring key value).

It would be understood that the key value input by the user may be incorrect or null. In this case, the configuration of the network has failed, i.e., the household appliance cannot access to the internet. At this time, the target configuring key value can be determined according to the preset manner, and the target configuring key value is input for successful configuration of the network of the household appliance. Examples are as follows.

For a first example, all configuring key values which are not input are acquired, and all configuring key values which are not input are input in sequence for verification to determine the target configuring key value.

When the key value input by the user may be incorrect or null, all configuring key values which are not input are acquired, and are automatically input in sequence for verification, thereby determining the target configuring key value and inputting the target configuring key value. For example, when the key value input by the user is null, all configuring key values 1, 2, 3 and 4 which are not input, are acquired, and are verified in sequence, i.e., the verification is performed in a polling manner, such as when 2 is verified successful upon input, and 2 is input.

For a second example, a length of the password is acquired, and the target configuring key value corresponding to the length of the password is queried in a preset database, and the target configuring key value is input.

A one-to-one correspondence between the password lengths set in advance and the target configuring key values is preset, and the one-to-one correspondence is stored in the preset database. A length of the password is acquired directly when the key value input by the user may be incorrect or null, and the target configuring key value corresponding to the length of the password is queried in the preset database, and the target configuring key value is input.

The technical solutions provided in above embodiments of the present disclosure have at least the following technical effects or advantages.

A wireless access point name and a password input by a user are acquired in a mode of configuring the network of the household appliance; and it is verified that whether the wireless access point name and the password are correct; a configuring key value input by the user is acquired, if it is verified that the wireless access point name and the password are correct; and a target configuring key value is determined according to a preset manner, and the target configuring key value is input for successful configuration of the network of the household appliance, if configuration of the network is verified to fail according to the configuring key value, which solves the technical problem in the related art that the user needs to re-input manually when the configuring key value filled by the user is null or incorrect, where the operation is tedious, and can quickly determine the target configuring key value and input the target configuring key value when the filled configuring key value is null or incorrect without additional cost, and thus improving the accuracy and efficiency for configuring a network of a household appliance.

Embodiment 2

Figure 3:
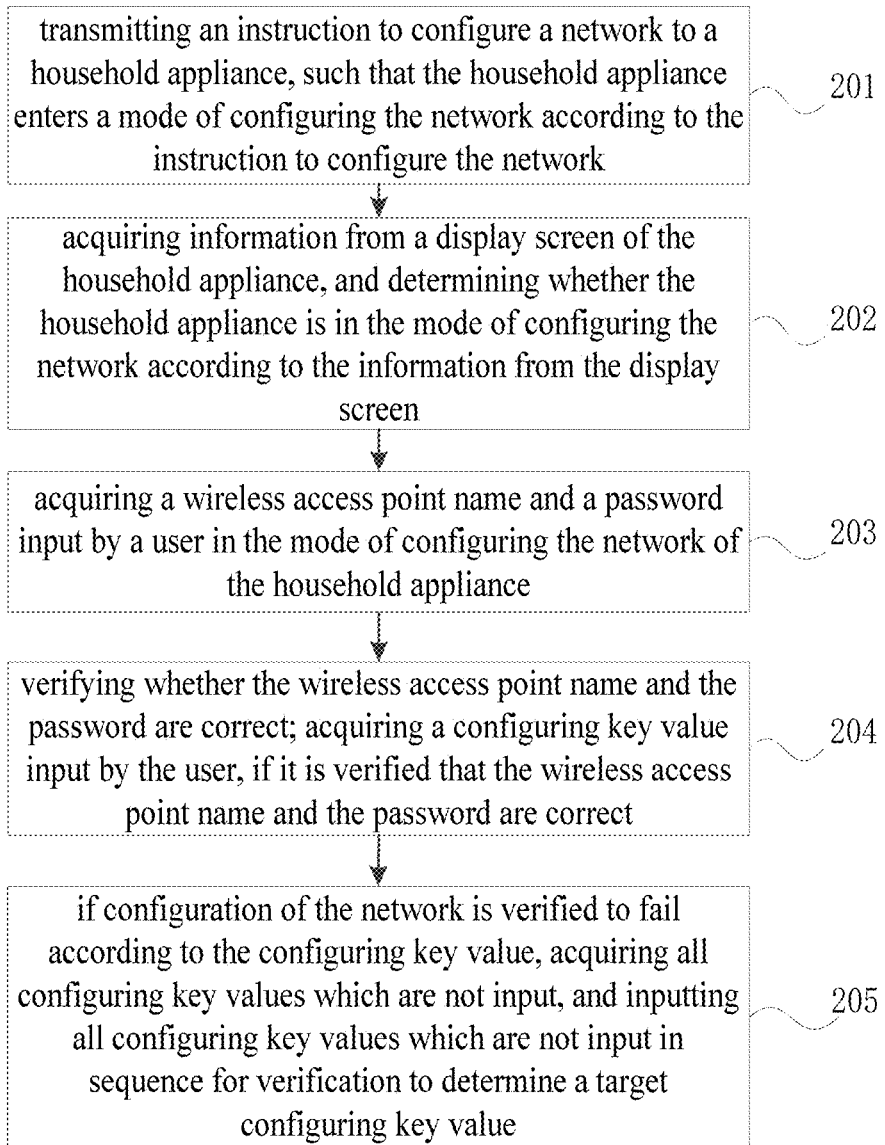
FIG. 3 is a flow chart showing a method for configuring a network of a household appliance according to Embodiment 2 of the present disclosure.

FIG. 3 is a flow chart showing a method for configuring a network of a household appliance provided in Embodiment 2 of the present disclosure.

As shown in FIG. 3, the method for configuring a network of a household appliance may include the following steps: steps 201 to 205.

At step 201, an instruction to configure the network is transmitted to the household appliance, such that the household appliance enters the mode of configuring the network according to the instruction to configure the network.

The instruction to configure the network may be transmitted to the household appliance in manners such as through a remote controller or a controller of a touch-control household appliance and so on, such that the household appliance enters the mode of configuring the network according to the instruction to configure the network.

At step 202, information from a display screen of the household appliance is acquired, and it is determined whether the household appliance is in the mode of configuring the network according to the information from the display screen.

After the household appliance enters the mode of configuring the network, it may be displayed on the display screen that the household appliance enters the mode of configuring the network. Alternatively, it may also be determined that whether the household appliance is in the mode of configuring the network in a manner such as voice broadcast or changes of the indicator light, etc.

At step 203, the wireless access point name and the password input by the user are acquired in the mode of configuring the network of the household appliance.

At step 204, it is verified that whether the wireless access point name and the password are correct, and the configuring key value input by the user is acquired when the wireless access point name and the password are correct.

The wireless access point name and the password input by the user can be acquired in the mode of configuring the network of the household appliance, and a correct password corresponding to the wireless access point name can be acquired according to a preset key database or data table, etc. It is verified that whether the password input by the user are correct, and the configuring key value input by the user is acquired when the wireless access point name and the password are correct.

At step 205, if configuration of the network is verified to fail according to the configuring key value, all configuring key values which are not input are acquired, and all configuring key values which are not input are input in sequence for verification to determine the target configuring key value.

When the key value input by the user may be incorrect or null, all configuring key values which are not input are acquired, and are automatically input in sequence for verification, thereby determining the target configuring key value and inputting the target configuring key value. For example, when the key value input by the user is null, all configuring key values 1, 2, 3 and 4 which are not input, are acquired, and are verified in sequence, i.e., the verification is performed in a polling manner, such as when 2 is verified successful upon input, and 2 is input.

As an example, an application scenario in embodiments of the present disclosure may be shown as Embodiment 3.

Embodiment 3

Figure 4:
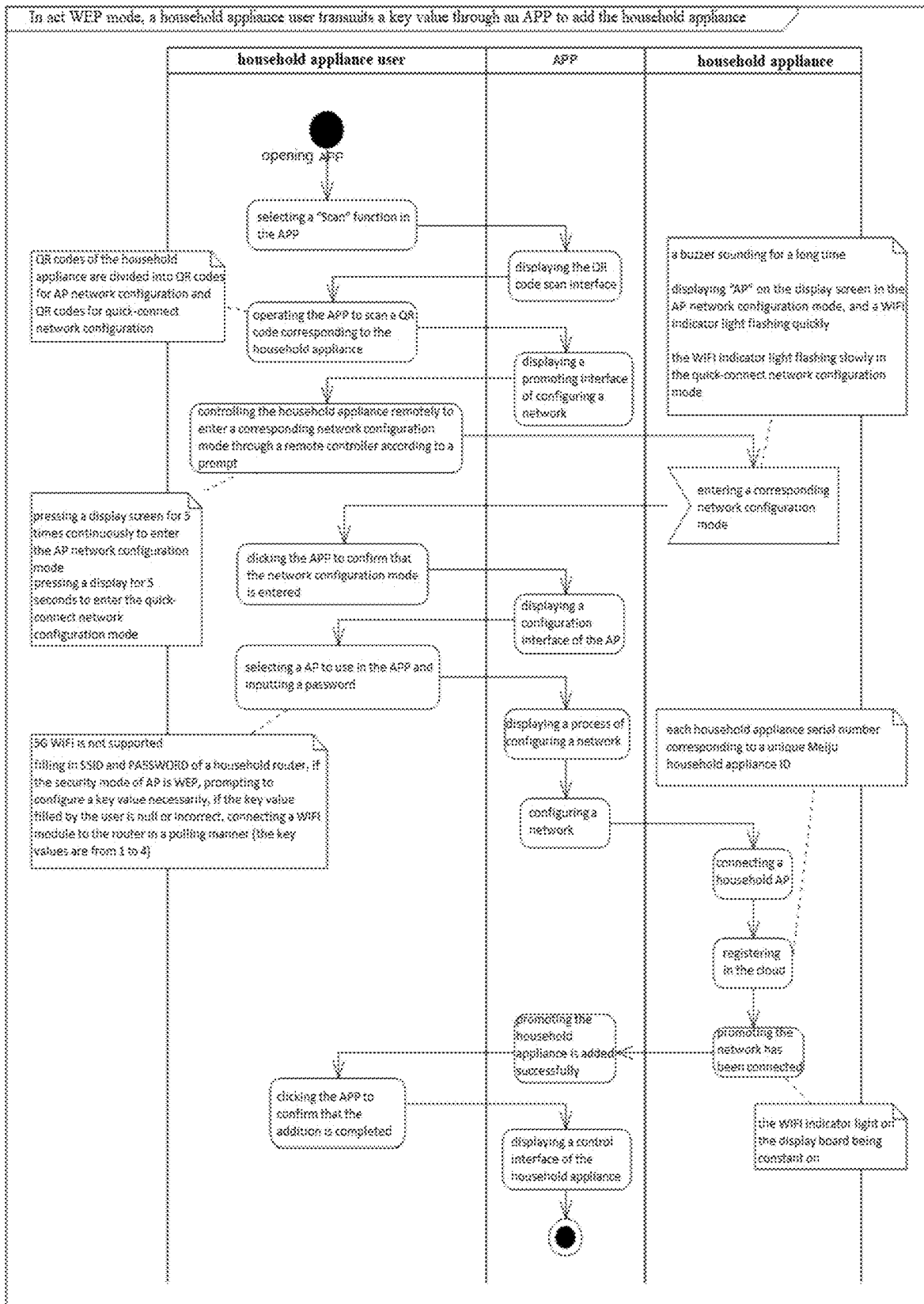
FIG. 4 is a flow chart showing a method for configuring a network of a household appliance according to Embodiment 3 of the present disclosure.

FIG. 4 is a flow chart showing a method for configuring a network of a household appliance provided in Embodiment 3 of the present disclosure.

As shown in FIG. 4, the method for configuring a network of a household appliance may include the following steps.

At step 1, a two-dimensional code image corresponding to the household appliance is scanned, and after an interface of configuring a network is displayed, it is confirmed that the mode of configuring the network is entered.

The household appliance enters the mode of configuring the network according to the instruction to configure the network by continuously pressing the screen of the household appliance according to a preset number of times, or by pressing the screen of the household appliance for a preset duration.

The household appliance may indicate that it enters the mode of configuring the network in manners such as a buzzer sounding for a long time, or the display screen displaying that the mode of configuring the network is entered, or changes of a WIFI indicator light, etc.

At step 2, the wireless access point name and the password input by the user are acquired, and a configuration progress is displayed.

The wireless access point name and the password are filled in when the network is configuring. If the security mode of the wireless access point is WEP, it is prompted to input the configuring key value necessarily. If the configuring key value input by the user is null or incorrect, a WIFI module is connected to a router in a polling manner, where the configuring key values are from 1 to 4. In the WEP mode, the user transmits the configuring key value through an application program to add the household appliance, and the configuring key value is transmitted to the WIFI module by a terminal when the network is configuring without additional cost, thereby ensuring fast access of the appliance, and improving the experience of configuring the network.

At step 3, after the configuration of the network is successful, the household appliance is registered in the cloud, and messages indicating that the network has been connected and the household appliance is added successfully are prompted.

After the addition is confirmed, an operation control interface is displayed on the interface of the application program to satisfy the user experience.

Based on the same inventive conception, the present disclosure further provides in embodiments an apparatus corresponding to the method in Embodiments 1 to 3 (refer to Embodiment 4).

Embodiment 4

Figure 5:
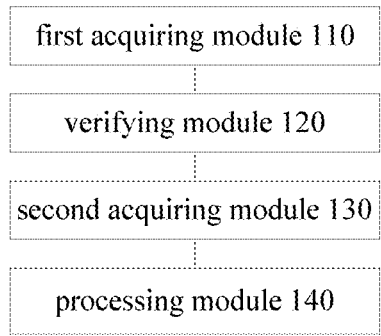
FIG. 5 is a block diagram showing an apparatus for configuring a network of a household appliance according to Embodiment 4 of the present disclosure.

FIG. 5 is a block diagram showing an apparatus for configuring a network of a household appliance provided in Embodiment 4 of the present disclosure.

As shown in FIG. 5, the apparatus for configuring a network of a household appliance includes: a first acquiring module 110, a verifying module 120, a second acquiring module 130 and a processing module 140.

The first acquiring module 110 is configured to acquire a wireless access point name and a password input by a user in a mode of configuring the network of the household appliance.

The verifying module 120 is configured to verify whether the wireless access point name and the password are correct.

The second acquiring module 130 is configured to acquire a configuring key value input by the user, if it is verified that the wireless access point name and the password are correct.

The processing module 140 is configured to determine a target configuring key value according to a preset manner and input the target configuring key value for successful configuration of the network of the household appliance, if configuration of the network is verified to fail according to the configuring key value.

Embodiment 5

Figure 6:
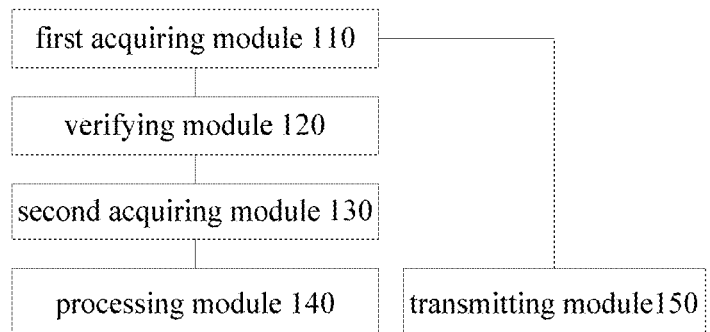
FIG. 6 is a block diagram showing an apparatus for configuring a network of a household appliance according to Embodiment 5 of the present disclosure.

FIG. 6 is a block diagram showing an apparatus for configuring a network of a household appliance provided in Embodiment 5 of the present disclosure.

As shown in FIG. 6, based on FIG. 5, the apparatus for configuring a network of a household appliance includes a transmitting module 150.

The transmitting module 150 is configured to transmit an instruction to configure the network to the household appliance, such that the household appliance enters the mode of configuring the network according to the instruction to configure the network.

Embodiment 6

Figure 7:
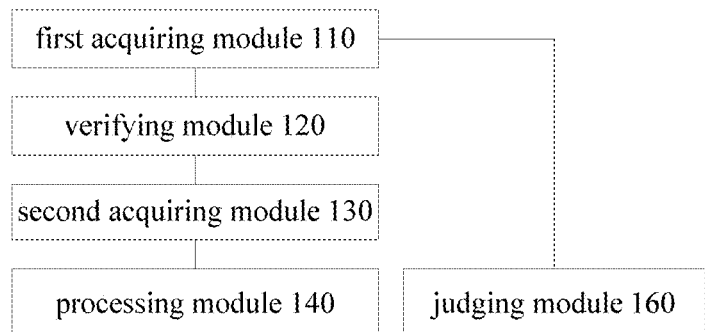
FIG. 7 is a block diagram showing an apparatus for configuring a network of a household appliance according to Embodiment 6 of the present disclosure.

FIG. 7 is a block diagram showing an apparatus for configuring a network of a household appliance provided in Embodiment 6 of the present disclosure.

As shown in FIG. 7, based on FIG. 5, the apparatus for configuring a network of a household appliance includes a judging module 160.

The judging module 160 is configured to acquire information from a display screen of the household appliance, and determine whether the household appliance is in the mode of configuring the network according to the information from the from screen; or the judging module is further configured to acquire information about an indicator light of the household appliance, and determine whether the household appliance is in the mode of configuring the network according to the information about the indicator light.

As a possible embodiment, the target configuring key value may be determined according to the preset manner, and the target configuring key value is input for successful configuration of the network of the household appliance. Examples are as follows.

For a first example, all configuring key values which are not input are acquired, and all configuring key values which are not input are input in sequence for verification to determine the target configuring key value.

When the key value input by the user may be incorrect or null, all configuring key values which are not input are acquired, and are automatically input in sequence for verification, thereby determining the target configuring key value and inputting the target configuring key value. For example, when the key value input by the user is null, all configuring key values 1, 2, 3 and 4 which are not input, are acquired, and are verified in sequence, i.e., the verification is performed in a polling manner, such as when 2 is verified successful upon, and 2 is input.

For a second example, a length of the password is acquired, and the target configuring key value corresponding to the length of the password is queried in a preset database, and the target configuring key value is input.

A one-to-one correspondence between the password lengths set in advance and the target configuring key values is preset, and the one-to-one correspondence is stored in the preset database. A length of the password is acquired directly when the key value input by the user may be incorrect or null, and the target configuring key value corresponding to the length of the password is queried in the preset database, and the target configuring key value is input.

It should be noted that, the explanation on the method for configuring a network of a household appliance in Embodiments 1 to 3, is also applicable to the apparatus for configuring a network of a household appliance in the embodiments, and will not be repeated here.

The technical solutions provided in above embodiments of the present disclosure have at least the following technical effects or advantages.

A wireless access point name and a password input by a user are acquired in a mode of configuring the network of the household appliance; and it is verified that whether the wireless access point name and the password are correct; a configuring key value input by the user is acquired, if it is verified that the wireless access point name and the password are correct; and a target configuring key value is determined according to a preset manner, and the target configuring key value is input for successful configuration of the network of the household appliance, if configuration of the network is verified to fail according to the configuring key value, which solves the technical problem in the related art that the user needs to re-input manually when the configuring key value filled by the user is null or incorrect, where the operation is tedious, and can quickly determine the target configuring key value and input the target configuring key value when the filled configuring key value is null or incorrect without additional cost, and thus improving the accuracy and efficiency for configuring a network of a household appliance.

As the apparatus for configuring a network of a household appliance in Embodiment 5 of the present disclosure, is the apparatus used for the implementation of the method for configuring a network of a household appliance in Embodiments 1 to 3 of the present disclosure, and based on the method introduced by Embodiments 1 to 3 of the present disclosure, one skilled in the art would understand the specific structures and modifications of the apparatus, which will not be repeated here accordingly. All the apparatus used in the method of Embodiments 1 to 3 of the present disclosure fall within the scope of protection intended by the present disclosure.

Based on the same inventive conception, the present disclosure further provides in embodiments a controller corresponding to the method in Embodiments 1 to 3 (refer to Embodiment 7).

Embodiment 7

The electronic device in embodiments of the present disclosure includes: a memory; a hardware processor; and a computer program stored in the memory and executable by the processor, wherein the hardware processor, when executing the program, implements a method for configuring a network of a household appliance provided in above Embodiments 1 to 3.

The technical solutions provided in above embodiments of the present disclosure have at least the following technical effects or advantages.

A wireless access point name and a password input by a user are acquired in a mode of configuring the network of the household appliance; and it is verified that whether the wireless access point name and the password are correct; a configuring key value input by the user is acquired, if it is verified that the wireless access point name and the password are correct; and a target configuring key value is determined according to a preset manner, and the target configuring key value is input for successful configuration of the network of the household appliance, if configuration of the network is verified to fail according to the configuring key value, which solves the technical problem in the related art that the user needs to re-input manually when the configuring key value filled by the user is null or incorrect, where the operation is tedious, and can quickly determine the target configuring key value and input the target configuring key value when the filled configuring key value is null or incorrect without additional cost, and thus improving the accuracy and efficiency for configuring a network of a household appliance.

As the electronic device introduced by Embodiment 7 of the present disclosure, is the electronic device used for the implementation of the method for configuring a network of a household appliance in Embodiments 1 to 3 of the present disclosure, and based on the method introduced by Embodiments 1 to 3 of the present disclosure, one skilled in the art would understand the specific structures and modifications of the electronic device, which will not be repeated here accordingly. All the controller used in the method of Embodiments 1 to 3 of the present disclosure fall within the scope of protection intended by the present disclosure.

Based on the same inventive conception, the present disclosure further provides in embodiments a computer-readable storage medium corresponding to the method in Embodiments 1 to 3 (refer to Embodiment 8).

Embodiment 8

The computer-readable storage medium in embodiments of the present disclosure, having stored therein a computer program that, when executed by a processor, implements a method for configuring a network of a household appliance provided in above Embodiments 1 to 3.

The technical solutions provided in above embodiments of the present disclosure have at least the following technical effects or advantages.

A wireless access point name and a password input by a user are acquired in a mode of configuring the network of the household appliance; and it is verified that whether the wireless access point name and the password are correct; a configuring key value input by the user is acquired, if it is verified that the wireless access point name and the password are correct; and a target configuring key value is determined according to a preset manner, and the target configuring key value is input for successful configuration of the network of the household appliance, if configuration of the network is verified to fail according to the configuring key value, which solves the technical problem in the related art that the user needs to re-input manually when the configuring key value filled by the user is null or incorrect, where the operation is tedious, and can quickly determine the target configuring key value and input the target configuring key value when the filled configuring key value is null or incorrect without additional cost, and thus improving the accuracy and efficiency for configuring a network of a household appliance.

As the computer-readable storage medium introduced by Embodiment 9 of the present disclosure, is the computer-readable storage medium used for the implementation of the method for configuring a network of a household appliance in Embodiments 1 to 3 of the present disclosure, and based on the method introduced by Embodiments 1 to 3 of the present disclosure, one skilled in the art would understand the specific structures and modifications of the computer-readable storage medium, which will not be repeated here accordingly. All the computer-readable storage medium used in the method of Embodiments 1 to 3 of the present disclosure fall within the scope of protection intended by the present disclosure.

It should be understood by those skilled in the art, that the embodiments of this disclosure may be provided as methods, systems or computer program products. Therefore, the disclosure may adopt embodiments in forms of hardware only, software only, or a combination of software and hardware. Furthermore, the disclosure may adopt forms of computer program products executed on one or more computer usable storage media (including but not being limited to disk storage, CD-ROM and optical storage, etc.) containing computer usable program codes.

The present disclosure is described in reference to the method, the device (system) and the flowchart and/or a block diagram of a computer program product according to the embodiments of the present disclosure. It should be understood that each process and/or block in the flowcharts and/or block diagrams, and combinations of processes and/or blocks in the flowcharts and/or block diagrams, may be realized by computer program instructions. These computer program instructions may be provided to a general-purpose computer, a special-purpose computer, an embedded processor, or processors of other programmable data processing devices, to create a machine, such that a device for realizing functions designated in one or more processes in the flowcharts and/or in one or more blocks in the block diagrams, may be created by instructions performed by a computer or processors of other programmable data processing devices.

These computer program instructions may further be stored in a computer readable storage that can boot a computer or other programmable data processing devices to work in a specific way, such that a manufactured goods comprising an instruction device may be created by the instructions stored in the said computer readable storage, and the said instruction device realizes the functions designated in one or more processes in the flowcharts and/or in one or more blocks in the block diagrams.

These computer program instructions may further be loaded into a computer or other programmable data processing devices, such that a series of operating steps may be performed on the computer or other programmable data processing devices, so as to generate processes realized by the computer, such that steps for realizing the functions designated in one or more processes in the flowcharts and/or in one or more blocks in the block diagrams may be provided by the instructions executed on the computer or other programmable data processing devices.

It is to be noted that in the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Although preferred embodiments of the present disclosure have been described, as long as those skilled in the art learn the basic inventive concept, other alterations or modifications may be made to these embodiments. Therefore, the appended claims are intended to be interpreted as embracing the preferred embodiments and all the alterations and modifications falling into the scope of the present disclosure.

Apparently, those skilled in the art may make various modifications and variations to the disclosure without departing the spirit and scope of the disclosure. Thus, the disclosure intends to include these modifications and variations if they belong to the scope of the claims of the disclosure and the equivalent technology thereof.

What is claimed is:

1. A method for configuring a network of a household appliance, comprising:
    acquiring a wireless access point name and a password input by a user in a mode of configuring the network of the household appliance;
    verifying whether the wireless access point name and the password are correct;
    acquiring a configuring key value input by the user, based on a verification that the wireless access point name and the password are correct; and
    determining a target configuring key value according to a preset manner, and inputting the target configuring key value for successful configuration of the network of the household appliance, based on a verification that configuration of the network fails according to the configuring key value.

2. The method according to claim 1, wherein before the acquiring the wireless access point name and the password input by the user in the mode of configuring the network of the household appliance, the method further comprises:
    transmitting an instruction to configure the network to the household appliance, such that the household appliance enters the mode of configuring the network according to the instruction to configure the network.

3. The method according to claim 1, wherein before the acquiring the wireless access point name and the password input by the user in the mode of configuring the network of the household appliance, the method further comprises:
    acquiring information from a display screen of the household appliance, and determining whether the household appliance is in the mode of configuring the network according to the information from the display screen; or
    acquiring information about an indicator light of the household appliance, and determining whether the household appliance is in the mode of configuring the network according to the information about the indicator light.

4. The method according to claim 1, wherein the determining the target configuring key value according to the preset manner and inputting the target configuring key value comprise:
    acquiring all configuring key values which are not input, and inputting all configuring key values which are not input in sequence for verification to determine the target configuring key value.

5. The method according to claim 1, wherein the determining the target configuring key value according to the preset manner and inputting the target configuring key value comprise:
    acquiring a length of the password; and
    querying a target configuring key value corresponding to the length of the password in a preset database, and inputting the target configuring key value.

6. An apparatus for configuring a network of a household appliance, comprising a hardware processor, wherein the hardware processor is configured to:
    acquire a wireless access point name and a password input by a user in a mode of configuring the network of the household appliance;
    verify whether the wireless access point name and the password are correct;
    acquire a configuring key value input by the user, based on a verification that the wireless access point name and the password are correct; and
    determine a target configuring key value according to a preset manner and input the target configuring key value for successful configuration of the network of the household appliance, based on a verification that configuration of the network fails according to the configuring key value.

7. The apparatus according to claim 6, wherein the hardware processor is further configured to:
    transmit an instruction to configure the network to the household appliance, such that the household appliance enters the mode of configuring the network according to the instruction to configure the network.

8. The apparatus according to claim 6, wherein the hardware processor is further configured to:
    acquire information from a display screen of the household appliance, and determine whether the household appliance is in the mode of configuring the network according to the information from the from screen; or acquire information about an indicator light of the household appliance, and determine whether the household appliance is in the mode of configuring the network according to the information about the indicator light.

9. An electronic device comprising:
a memory;
a hardware processor; and
a computer program stored in the memory and executable by the hardware processor,
wherein the hardware processor, when executing the program, implements the method for configuring a network of a household appliance according to claim 1.

10. A non-transitory computer-readable storage medium having stored therein a computer program that, when executed by a processor, implements the method for configuring a network of a household appliance according to claim 1.

* * * * *